United States Patent
Grätz

(10) Patent No.: US 7,946,659 B2
(45) Date of Patent: May 24, 2011

(54) THRU-AXLE SYSTEM FOR WHEEL SECUREMENT

(75) Inventor: Michael Grätz, Wiggensbach (DE)

(73) Assignee: Liteville, GmbH, Wiggensbach (DE)

( * ) Notice: Subject to any disclaimer, the term of this patent is extended or adjusted under 35 U.S.C. 154(b) by 72 days.

(21) Appl. No.: 12/114,276

(22) Filed: May 2, 2008

(65) Prior Publication Data

US 2008/0272645 A1 Nov. 6, 2008

(30) Foreign Application Priority Data

May 5, 2007 (DE) .................. 20 2007 006 451 U

(51) Int. Cl.
*B60B 35/00* (2006.01)
(52) U.S. Cl. ..................................... 301/124.2
(58) Field of Classification Search .... 301/110.5–110.6, 301/111.06, 124.1–124.2, 126, 128; 280/276
See application file for complete search history.

(56) References Cited

U.S. PATENT DOCUMENTS

| | | | | |
|---|---|---|---|---|
| 4,632,415 A | * | 12/1986 | San Hai | 301/126 |
| 5,492,211 A | * | 2/1996 | Wu | 301/110.5 |
| 5,997,104 A | * | 12/1999 | Campagnolo | 301/110.5 |
| 6,089,675 A | * | 7/2000 | Schlanger | 301/124.2 |
| 6,264,285 B1 | * | 7/2001 | Yu | 301/110.5 |
| 6,412,803 B1 | * | 7/2002 | Lalikyan et al. | 301/124.2 |
| 6,886,894 B2 | * | 5/2005 | Kanehisa et al. | 301/124.1 |
| 7,494,145 B2 | * | 2/2009 | Schroeder et al. | 301/111.06 |
| 2008/0197600 A1 | * | 8/2008 | Watarai | 301/124.2 |

FOREIGN PATENT DOCUMENTS

| | | |
|---|---|---|
| CH | 272136 A | 3/1951 |
| EP | 1452435 A2 | 1/2004 |
| WO | WO2005051753 | 6/2005 |
| WO | WO2005051753 A1 | 6/2005 |

* cited by examiner

*Primary Examiner* — Jason R Bellinger
(74) *Attorney, Agent, or Firm* — Thomas R. FitzGerald, Esq.; Nicholas J. Gallo, Esq.; Hiscock & Barclay, LLP

(57) ABSTRACT

A thru-axle system installs a wheel on a hub disposed between a pair of dropouts of a frame or fork. An axle (10) extends between dropouts and supports a wheel on a hub (60). The axle has a first end with at least one radially protruding shoulder (12). The second end has a thread (16) for engaing a threaded sleeve (5). A bushing (20) between the radially protruding shoulder (12) and the other dropout has a central bore with first and second inner diameters. Its first inner diameter is large enough to admit the radially protruding shoulder and the second diameter is large enough to admit the axle portion of the axle. The bushing (20) has an external tapered surface (22) facing the other dropout for transmitting an axial force acting on the shoulder to the bushing and from the bushing to the first dropout.

15 Claims, 7 Drawing Sheets

THRU-AXLE SYSTEM FOR WHEEL SECUREMENT

CROSS-REFERENCE TO RELATED APPLICATIONS

This application claims the benefit of the priority date of German patent appliation Serial Number DE 20 2007 006 451 filed May 5, 2007.

FIELD

The present invention relates to a thru-axle system for securing a wheel to a fork or frame dropout. More particularly the present invention relates to a thru-axle system for secruing a wheel in which the thru-axle head is held by means of a conical seat in the corresponding dropout of a frame or fork.

BACKGROUND

Although the following description of the present invention relates to a thru-axle system for securing a wheel to a bicycle, it is understood that the invention is not restricted thereto, but that as readily appreciated by the person skilled in the art it can apply just as well to motorcycles or any other subject matter where wheels are secured to a moveable devise.

Thru-axle systems for securing wheels are known from prior art examples which are usually engineered for securing wheels to the fork or frame dropouts of a bicycle. These prior art systems mostly comprise circular lead-throughs. The hub of a wheel is located between the lead-throughs. The axle is inserted through the hub and the lead-throughs and the wheel is locked in place by means of a bolt fastener and/or quick-release mechanism at the dropouts. To facilitate inserting the thru-axle the lead-throughs at the dropouts as well as the axle mount of the hub, the lead-throughs often have an inner diameter which is roughly 0.5 mm to 2 mm larger in diameter than the outer diameter of the thru-axle.

Experience with such prior art thru-axle system has shown that this difference in diameter between the axle in the dropouts can become unstable. The instability occurs when the wheel moves relative to the fork or frame. This may be caused, for example, by stress due to normal use of the bicycle, but is often caused by the user who either tightens the thru-axle too much or too little.

To avoid these drawbacks WO 2005/051753 discloses a thru-axle system in which the thru-axle with a threaded end that is inserted through a circular lead-through in a first dropout of a bicycle fork and screwed into a threaded receiver cap disposed at the opposite end. The tubular thru-axle is longitudinally slotted at both ends so that both ends are splayed by actuating the clamping mechanism that has conical portions on both ends. This reduces the play of the axle relative to the dropouts, producing a relatively secure non-positive connection between the thru-axle and the fork or frame of the bicycle.

Experience has shown, however, that this system carries a high risk of improper installation. For example, it may be screwed in with inadequate torque applied to the threaded cap or the axle may be clamped too weakly by the clamping mechanism. In addition, professional and semi-professional bicyclists require more precisely mounted wheels and more stable connections between the forks and the wheel for their cycling needs.

SUMMARY

The object of the present invention is to provide an improved thru-axle system for securing a wheel which overcomes the drawbacks of the prior art and, in particular reliably secures a wheel to a fork or frame, respectively. It also an object to provide a thru-axle system for securing a wheel to increase reliability by minimizing the risk that the user erroneously secures the wheel.

These and further objects are solved by a thru-axle system for securing a wheel in accordance with the scope of the appended claims.

In accordance therewith a thru-axle system according to the invention comprises an axle with an axle portion which, after installation, extends between a first dropout and a second dropout of a frame or a fork and serves to mount a wheel hub. In this arrangement the axle portion extends by known ways and means through the inner portion of the wheel hub.

The axle has at a first end at least one shoulder radially extending from the axel. When the axel is mounted, the shoulder transmits a force acting parallel to the direction of the longitudinal centerline of the axle. This shoulder at the first end of the axle has an outer diameter (thru-axle head) which is larger than that of the central portion of the axle.

In addition, the thru-axle system in accordance with the invention comprises a second end of the axle portion opposite the first end. The second end carries a thread and guides the axle through the lead-through in the first dropout, through the hub and through the second dropout. The second end is screwed into a complimentaly threaded end cap disposed at the second dropout.

In accordance with the invention the thru-axle system has at least one annular bushing member comprising a substantially centering lead-through or bore. At least part of the axle portion, when installed, passes through that lead-through (bore). In this arrangement the inner diameter of the annular bushing comprises a reduced diameter protuberance in the form of an annular wall that contacts the shoulder of the first end of the axle so that a force acting parallel to the longitudinal centerline of the thru-axle is transmitted at least partly to the annular bushing member.

The bore of the annular bushing member preferably has two different inner diameters, a smaller inner diameter preferably being arranged closer the second end of the axle for engaging the shoulder of the axle, and a larger inner diameter being preferably selected so that the annular bushing member can be mounted over the thru-axle head in a snug fit.

The annular bushing member also comprises a load surface on its outer diameter at the side facing the second end of the axle portion. The load surface is inclined relative to the longitudinal centerline of the axle portion, and, in particular, is conically tapered. The load surface, when installed, comes into contact with a contact surface arranged at the first dropout corresponding thereto.

In conjunction of the load surface of the annular bushing and the contact surface of the first dropout results in a self-centering and substantially snug fit for the axle. The thru-axle system in accordance with the invention provides the annular bushing member as a member separate from the axle in the form of a sleeve through which the axle portion of the axle extends. This feature ensures the proper the friction between the contact surface and the load surface when screwing in the thru-axle. Unlike the prior art, it does not mislead the user to assume that the thru-axle has already been tightened with the required torque, when in reality that is not the case, thereby reducing the risk of imporoper installation.

In conclusion, the thru-axle system in accordance with the invention makes it possible for the annular bushing member mounted on the axle to release the screwed-in thru-axle even when there is corrosion between the load surface of the annular bushing member, on the one hand, and the contact surface of the dropout, on the other. This is because the contact surface between the shoulder of the axle and the reduced diameter protuberance of the annular bushing member is smaller than that between the inclined load surface and the contact surface corresponding thereto.

In one embodiment of the present invention the annular annular bushing member is slotted substantially parallel to the longitudinal centerline. In another embodiment annular bushing member is slotted substantially parallel to an axis in order to skew the axis of the longitudinal centerline with respect to the annular bushing member, or is slotted spirally relative to the longitudinal centerline of the axle.

These embodiments achieve a further improvement in locating and centering the thru-axle system in the first dropout. When the axle is installed, the slotted annular bushing is slightly compressed by the forces acting thereon, producing at least a partly positive connection of the annular bushing member at the first dropout in addition to the non-positive connection between the annular bushing member and the axle portion and/or thru-axle head.

Preferably in the region of the radially protruding shoulder the outer diameter of the first end comprises at least one groove in which an O-ring is arrangeable such that the O-ring is located substatially stationary on the axle and at least a part of the cross-section of the O-ring material protrudes beyond the outer diameter of the axle. Arranging an O-ring on the axle in this way makes it possible for the annular bushing member mounted on the axle to act like a sleeve which is held in place by the flexible deformation of the O-ring, likewise relative to the axle. This, for one thing, results in the annular bushing member being retained captive and, for another, ensures a snug fit of the annular bushing member on the axle.

Using a flexible material for the O-ring makes it possible to nevertheless achieve a non-positive connection between the annular bushing member and the axle and thus a particularly good snug fit of the axle in the dropout when installed. In another embodiment the inner diameter of the annular bushing member comprises a groove corresponding with the groove at the outer diameter of the axle that the O-ring engages, so that the annular bushing member, when mounted, is more strongly held in place relative to the axle.

In another preferred embodiment the load surface comprises at least one groove in which an O-ring is arrangeable such that a part of the cross-section of the O-ring material protrudes beyond the load surface.

Because of this embodiment when screwing in the thru-axle the friction between the load surface and the contact surface is further reduced until the O-ring material is sufficiently deformed by the force transmitted to the annular bushing member, resulting in a substantially positive connection between the load surface and the contact surface.

It is in this way the user may screw in the axle until the load surface comes into full contact with the contact surface. A slotted annular bushing member ensures the thru-axle is tightened with a sufficiently high torque to ensure a snug fit of the axle and thus reliably mount the wheel in the fork or frame. This further reduces the risk of improper installation.

In another embodiment of the thru-axle system in accordance with the invention the thread arranged at the second dropout is engineered as a female-threaded sleeve which is inserted and preferably rotatable in the dropout. Preferably the female thread of the sleeve into which the male thread on the second dropout is screwed, when mounting the axle, is engineered eccentric relative to the outer diameter of the sleeve and longitudinal centerline of the axle, respectively. This makes it possible to position the axle relative to the two dropouts by turning the sleeve with the thru-axle more or less screwed in place to thus compensate for production tolerances of the fork or frame so as to ensure true straight-ahead travel of the wheel.

In still another embodiment the contact surface arranged at the first dropout is engineered as an inner surface of a sleeve which is arranged in the first dropout preferably by insertion or screwing-in of the latter. This makes it possible to replace contact surfaces damaged by corrosion or distortion and facilitates producing frames or forks that have contact surfaces for use with a thru-axle in accordance with the invention. In conclusion, this embodiment also makes it possible to use the thru-axle system in accordance with the invention with all its advantages at least on some conventional forks or frames on the market simply by inserting a corresponding sleeve.

Preferably the axle of the thru-axle system in accordance with the invention comprises at the thru-axle head an Allen® socket (a trademark registered to Industrial fasteners, Inc. for hex-headed bolts and socket wrenches, Torx® head (a trademark registered to Textron Industries, Inc. for a six pointed star headed fasteners and sockets) or some similar means for locating a tool for inserting and tightening the axle in place. In this arrangement both Allen and Torx sockets have the advantage of being tools standard to the bicycle industry which, in addition, make it no problem to exert high torques on the axle.

It is, however, to be noted that the thru-axle system in accordance with the invention may also be provided with other means for inserting and tightening the axle in place, such as e.g. wing nuts, rotatable levers, especially in the form of quick-release fasteners, hexagon nuts and the like.

Preferably the outer part of its second end of the axial portion comprises a tapered cross section, resulting in the axle having a conical tapered outer end. This not only facilitates inserting the thru-axle into the lead-through of the first dropout and particularly into the inner portion of the wheel hub but also screwing it into the thread provided at second dropout.

In yet another preferred embodiment of the present invention the axle portion of the axle is made of a tubular material, which is preferably engineered extra thick in the region of the first and/or second end of the axle to adequately accommodate the tensile, compressive, shear and transverse forces in the region of the annular bushing member as well as in the region of the thread in use of the bicycle.

Using a tubular material also attains a reduction in weight unlike solid engineered axles. The tubular axles are practically just as stable as the solid axles. It is, however, also in keeping with the present invention to machine the axle portion of the axle solid.

To facilitate inserting the axle yet another embodiment of the invention provides a conically tapered cap at the second end of the axle. This cap is used during installaiton to facilitate guiding the axle through the lead-through at the first dropout and the inner portion of the wheel hub and engaging the thread at the second dropout. In another aspect of this embodiment after installation it is possible to remove the corresponding cap to further reduce weight while maintaining the full functionality.

It is particularly preferred that the thru-axle system in accordance with the invention provides for wheel installation with at least one further annular bushing member that has a partial longitudinal slot and includes a conically tapered load surface relative to the longitudinal centerline of the axle. The annular bushing member, when installed, comes into contact with a corresponding contact surface of the wheel hub. This secures the hub on the axle portion between the two dropouts with a positive connection and, respectively, non-positive connection in a snug fit.

Screwing and tightening the thru-axle in the second dropout generates a force acting along the longitudinal centerline of the thru-axle and upon at least one annular bushing member. The force presses the bushing against a corresponding contact surface of the hub, resulting in deformation of the annular bushing member due to the conicity of the load surface. This creates a non-positive connection between the at least one slotted annular bushing member and the axle portion. It is particularly preferred that the wheel hub is provided on both sides with such further annular bushing members to achieve a snug and particularly stable location of the wheel hub and thus of the wheel relative to the dropouts.

Preferably the conicity angles of the load surfaces and/or of the contact surfaces of the thru-axle system in accordance with the invention range between 20° and 70°, preferably between 30° and 60° and particularly preferred between 40° and 50° relative to the longitudinal centerline of the axle. Preferably the angles of conicity of the load surfaces and the contact surfaces in this arrangement are substantially the same.

The axle or its axle portion, the annular bushing members and/or threaded sleeve as well as further elements of the thru-axle system in accordance with the invention are preferably made at least partly of a material selected from a group including metals and metal alloys, preferably light metals and particularly preferred aluminum and aluminum alloys, carbon fiber materials, plastics and especially fiber-reinforced plastics, as well as composites and combinations of the above materials. In this arrangement, unlike materials are preferred for the axle, annular bushing members, and/or threaded sleeve as well as further elements of the thru-axle system in accordance with the invention to prevent contact of like materials which may result in the nuisance of creaking, increased or diminished friction, corrosion or the like.

BRIEF DESCRIPTION OF THE DRAWINGS

Further features of the present invention will now be detailed with reference to the claims and the figures in which:

DETAILED DESCRIPTION

Figure 1:
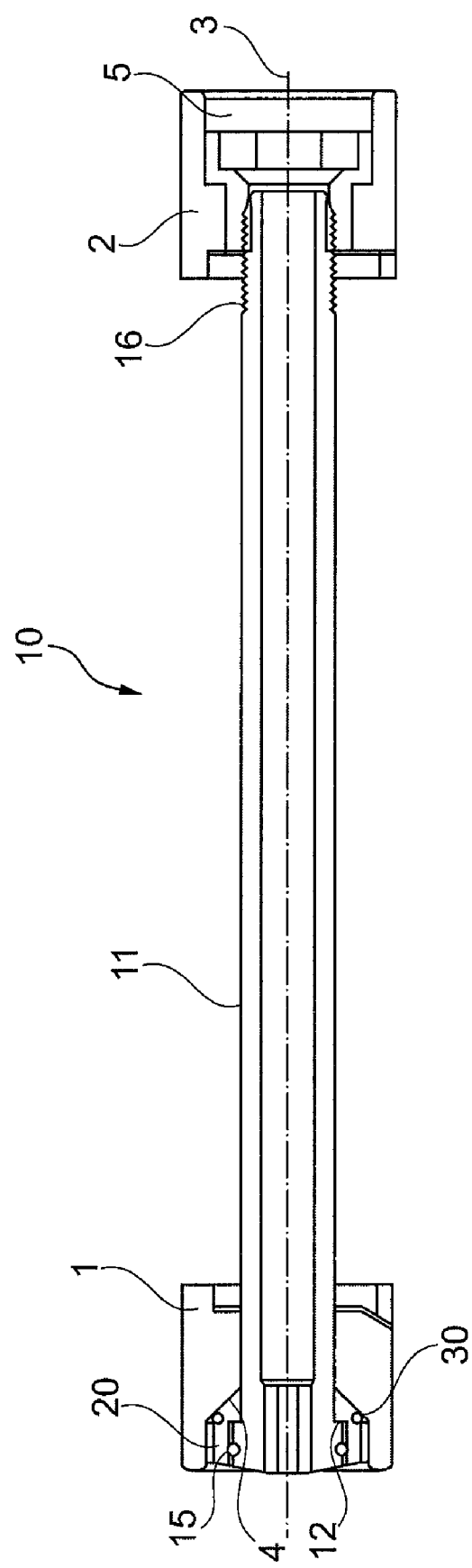
FIG. 1 illustrates a view of the thru-axle system in accordance with the invention shown installed.

Like members or members similar in function are identified by like reference numerals thruout the following description of the Figures.

Referring now to FIG. 1 there is illustrated how a thru-axle system in accordance with the invention for wheel installation comprises an axle 10 with an axle portion 11 extending at least partly between the first dropout 1 and second dropout 2 of a fork or a frame. The first dropout 1 comprises a substantially circular lead-through through which the axle portion 11 of the axle 10 extends.

At the first end of the axle portion 11 the axle comprises a shoulder 12 as a result of which the outer diameter of the axle 10 in this region is enlargened relative to the outer diameter of the axle portion extending between the dropouts.

At the second end of the axle portion 11 the axle 10 comprises a thread 16 which is screwed into a threaded sleeve 5 inserted at the second dropout 2. Screwing in and tightening the axle 10 produces a force acting parallel to the direction of the longitudinal centerline 3 between the two dropouts 1, 2 by which a wheel hub 60 arranged inbetween is held.

The threaded sleeve 5 is inserted in the second dropout 2 and can be rotated by means of am Allen key. The thread arranged in the threaded sleeve 5 is arranged slightly eccentrically to the circumference of the threaded sleeve 5 so that rotating the threaded sleeve 5 results in the longitudinal centerline 3 of the axle 10 being moved on a conical shell of very small diameter.

To facilitate passing the axle 10 through the lead-through (bore or hole) in the dropout 1 and screwing in the thread 16 into the threaded sleeve 5, the second end of the axle portion comprises a tapered outer diameter 40. The axle 10 of the thru-axle system as shown in FIG. 1 is made of a tubular material to save weight. The end of the thru-axle has an Allen socket 13 that makes it possible to insert a corresponding Allen tool for screwing and tightening the axle.

Inside the thru-axle system as shown in FIG. 1 is a annular bushing member 20 having a bore with first and second inner diameters. The first inner diameter most distant from the second end is larger than the second inner diameter that is closer to the second end. The first diameter is wide enough to receive the radial shoulder 12; the second inner diameter is smaller but wide enough to receive the axle portion 11. The junction of the two inner diameters forms an annular wall or inward projecting portuberence 23 for engaging the shoulder 12. When the reduced diameter protuberance (annular wall) 23 contacts the shoulder 12 of the axle, it transmits a force acting along the longitudnal centerline 3 of the axle. The force is being transmitted from the shoulder 12 to the annular bushing member 20, the inclined load surface 22 of which is urged against the contact surface 4.

The raised radial portion of the axle 10 has a groove 14 for receiving an O-ring 15 that engages a groove 24 at the inner diameter of the annular bushing member 20 correspondingly provided there. This effectively prevents the annular bushing member 20 from being released from the axle 10 when unscrewing and removing the axle 10.

In the region of the load surface 22 that is disposed inclined relative to the longitudinal centerline 3, the annular bushing member 20 has a further groove 25 for receiving an O-ring 30. When screwing and tightening the axle 10, this O-ring 30 prevents full contact of the load surface 22 at the contact surface 4 until the material of the O-ring 30 has been deformed or flattened sufficiently to protrud beyond the load surface 22. This ensures that the torque with which the axle is tightened is sufficient to ensure a secure snug fit of the axle.

Figure 2:
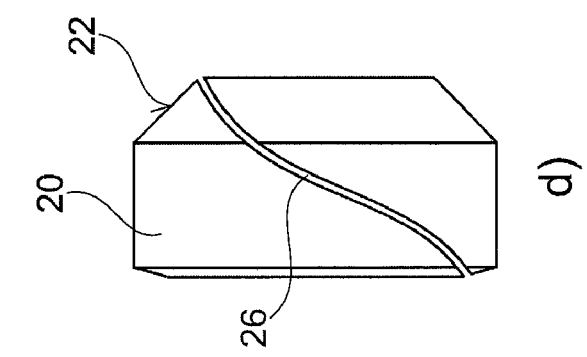
FIG. 2 illustrates various views of a first embodiment of a annular bushing member of a thru-axle system in accordance with the invention.
Figure 2:
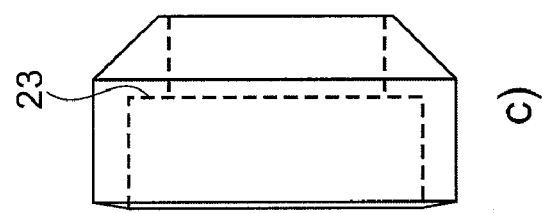
Figure 2:
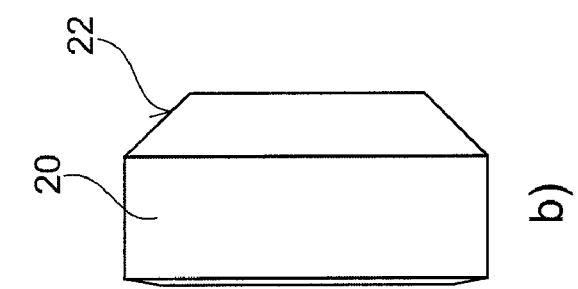
Figure 2:
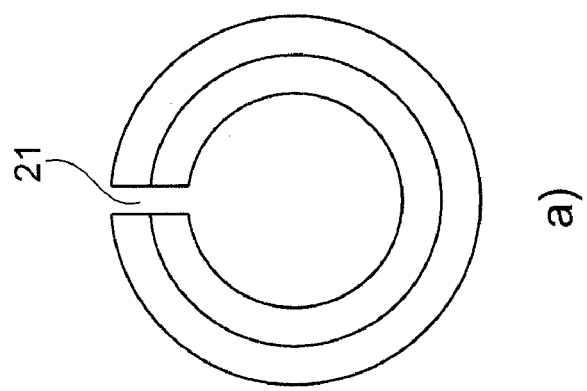

Referring now to FIG. 2 there is illustrated a first embodiment of a annular bushing member 20 of the thru-axle system in accordance with the invention. FIG. 2a) shows a longitudinal slot 21 oriented substantially parallel to the second dropout 2 of the axle 10 on which the annular bushing member 20 mounted. Neither its inner diameter nor its load surface 22 has a groove for receiving an O-ring. The inner reduced diameter protuberance 23 is machined so that when installed, the shoulder 12 of the axle 10 is in full contact with protruberence 23, resulting in a force acting substantially along the longitudinal centerline 3 of the axle 10 being transmitted by the shoulder 12 to the annular bushing member.

Figure 3:
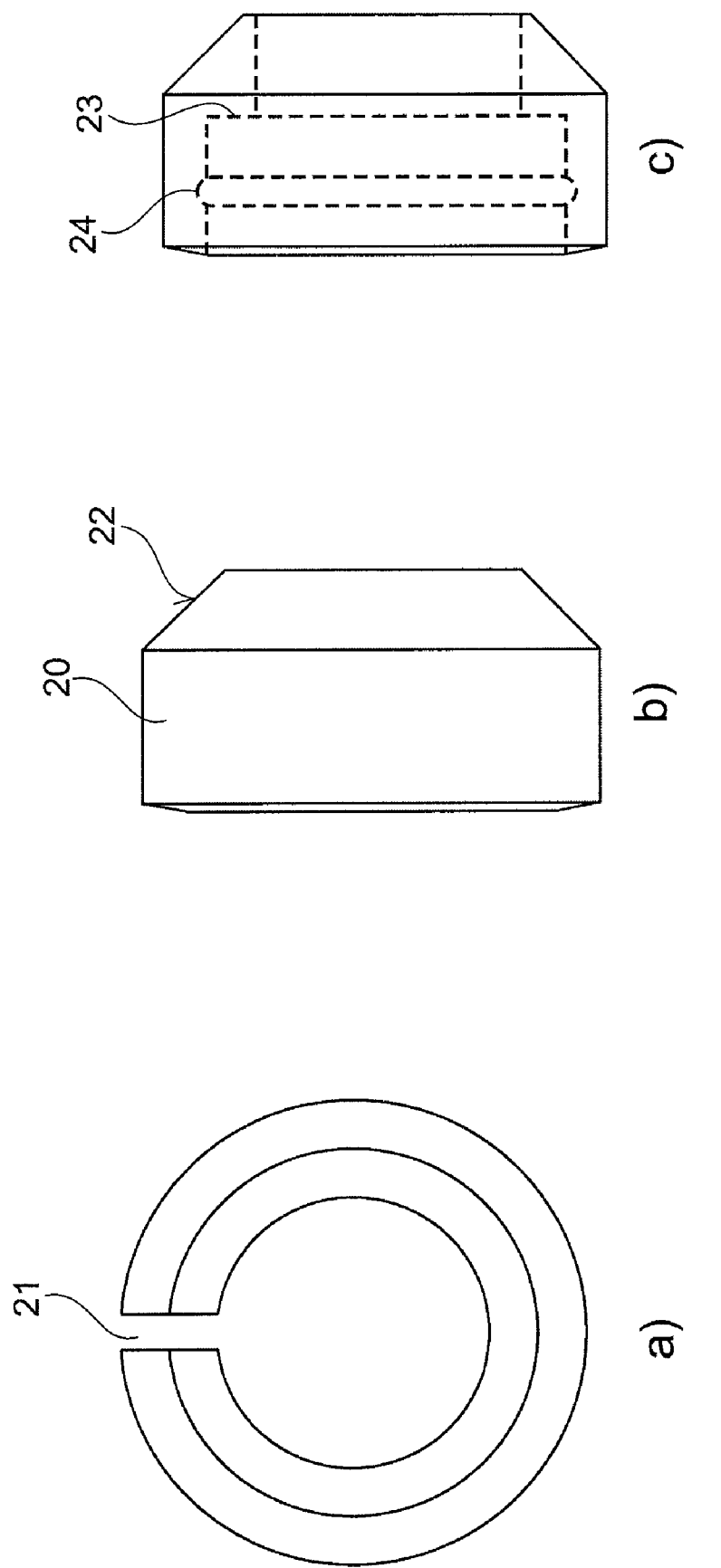
FIG. 3 illustrates various views of a second embodiment of a annular bushing member of a thru-axle system in accordance with the invention.

Referring now to FIG. 3 there is illustrated a further embodiment of a annular bushing member 20 of the thru-axle system in accordance with the invention which substantially corresponds to the annular bushing member 20 as shown in FIG. 2, except that this embodiment features a groove 24 on the inner diameter at the side of the annular bushing member facing the first end of the axle 10. An O-ring arranged on the axle 10 engages groove 24 when the annular bushing member 200 is mounted on the axle 10. This prevents unwanted release of the annular bushing member 20 from the axle 10 while ensuring a centered seating of the annular bushing member 20.

As in FIG. 2, the same annular bushing member has a slot 21 to ensure that the annular bushing member of FIG. 3 is slightly deformed when the axle 10 is screwed in and tightened, resulting in a non-positive connection between the axle 10 and the annular bushing member 20.

Figure 4:
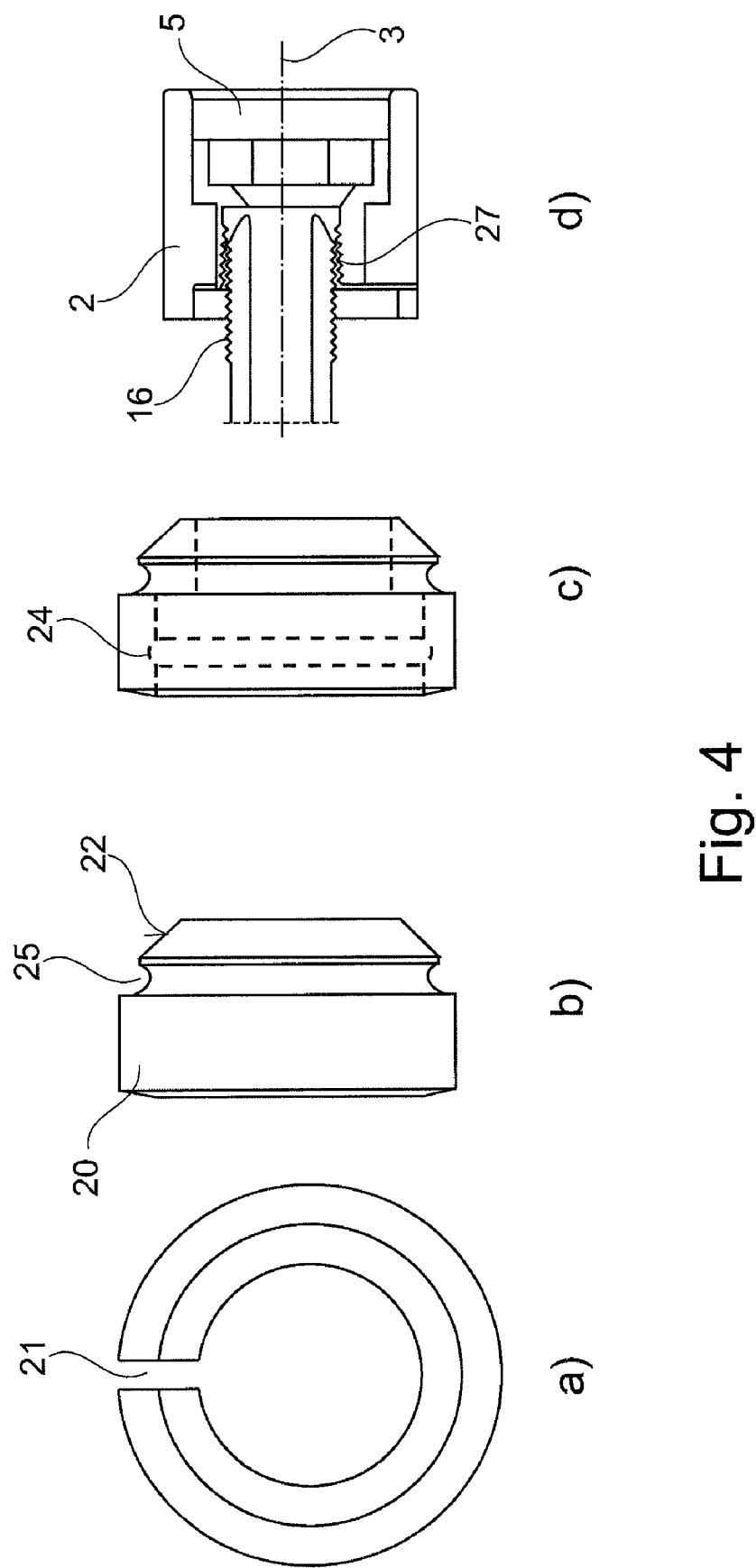
FIG. 4 illustrates various views of a third embodiment of a annular bushing member of a thru-axle system in accordance with the invention.

Referring now to FIG. 4 there is illustrated a further embodiment of a annular bushing member 20 of the thru-axle system in accordance with the invention corresponding to the annular bushing member as shown in FIG. 1. This annular bushing member 20 differs from the annular bushing member as shown in FIG. 3 by a groove 25 disposed on the tapered region of the load surface 22 and serving to hold an O-ring 30. The groove 25 is engineered so that the cross-section of the O-ring 30 material when not installed protrudes at least partly beyond the back protuberance 23. This reduces the frictional resistance between the load surface 22 and the contact surface 4 of the dropout 1 when screwing and tightning the axle 10 until O-ring 30 is deformed enought to achieve full surface contact of the load surface 22 on the contact surface 4.

Figure 5:
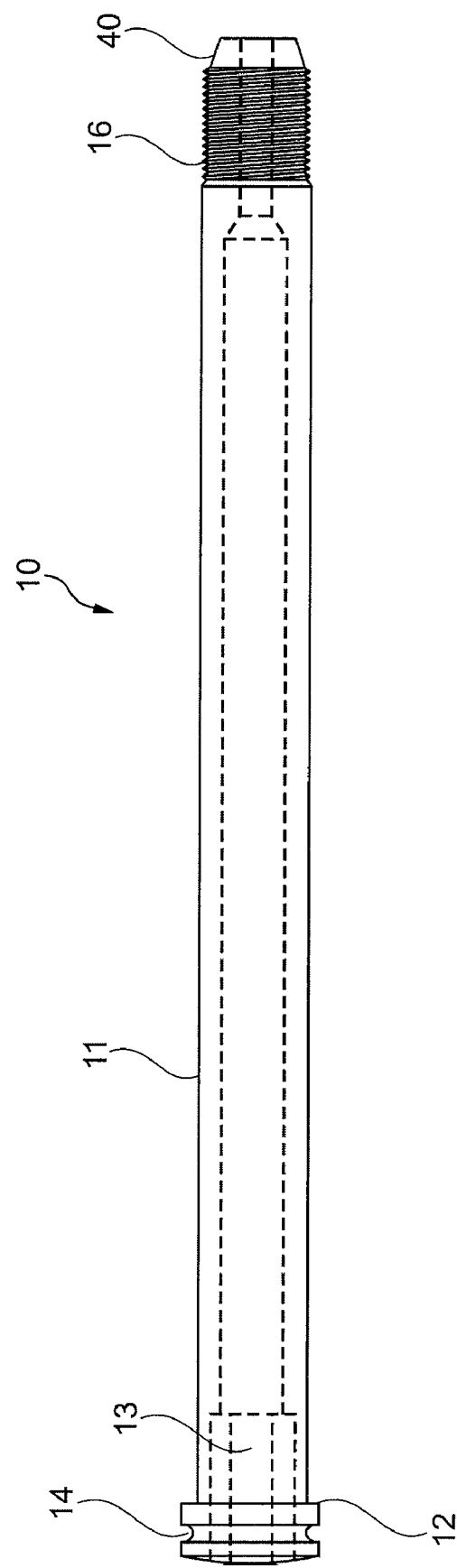
FIG. 5 illustrates a first embodiment of an axle of a thru-axle system in accordance with the invention.

Referring now to FIG. 5 there is illustrated an axle 10 of a thru-axle system in accordance with the invention. The inner diameter of the tubular axle 10 is reduced in the region of the thread 16 in order to increase in the material thickness and thereby withstand higher forces. Provided in the region of the first end of the axle 10 is an Allen socket 13 for locating a corresponding large sized tool to permit applying a much higher torque to the axle during tightening.

Figure 6:
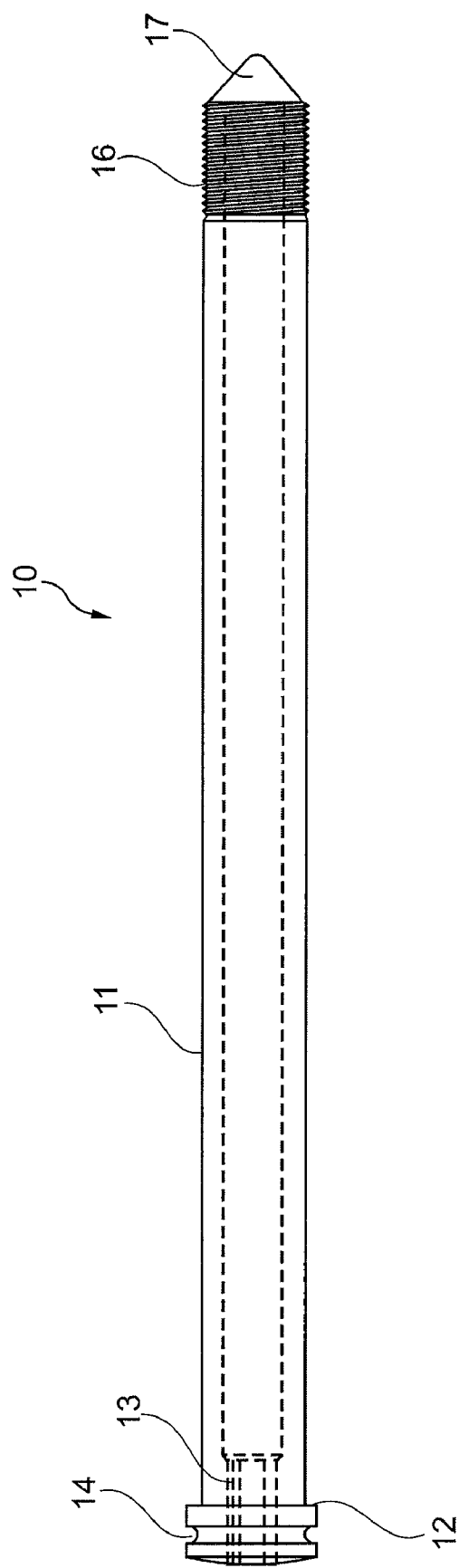
FIG. 6 illustrates a second embodiment of an axle of a thru-axle system in accordance with the invention.

Referring now to FIG. 6 there is illustrated an embodiment of an axle 10 in accordance with FIG. 1. In the region of the second end of the axle a conical, substantially sharp tapered cap 17 faciliates guiding the axle 10 through the first dropout 1, through the inner portion of the hub 60, and through the second dropout.

Figure 7:
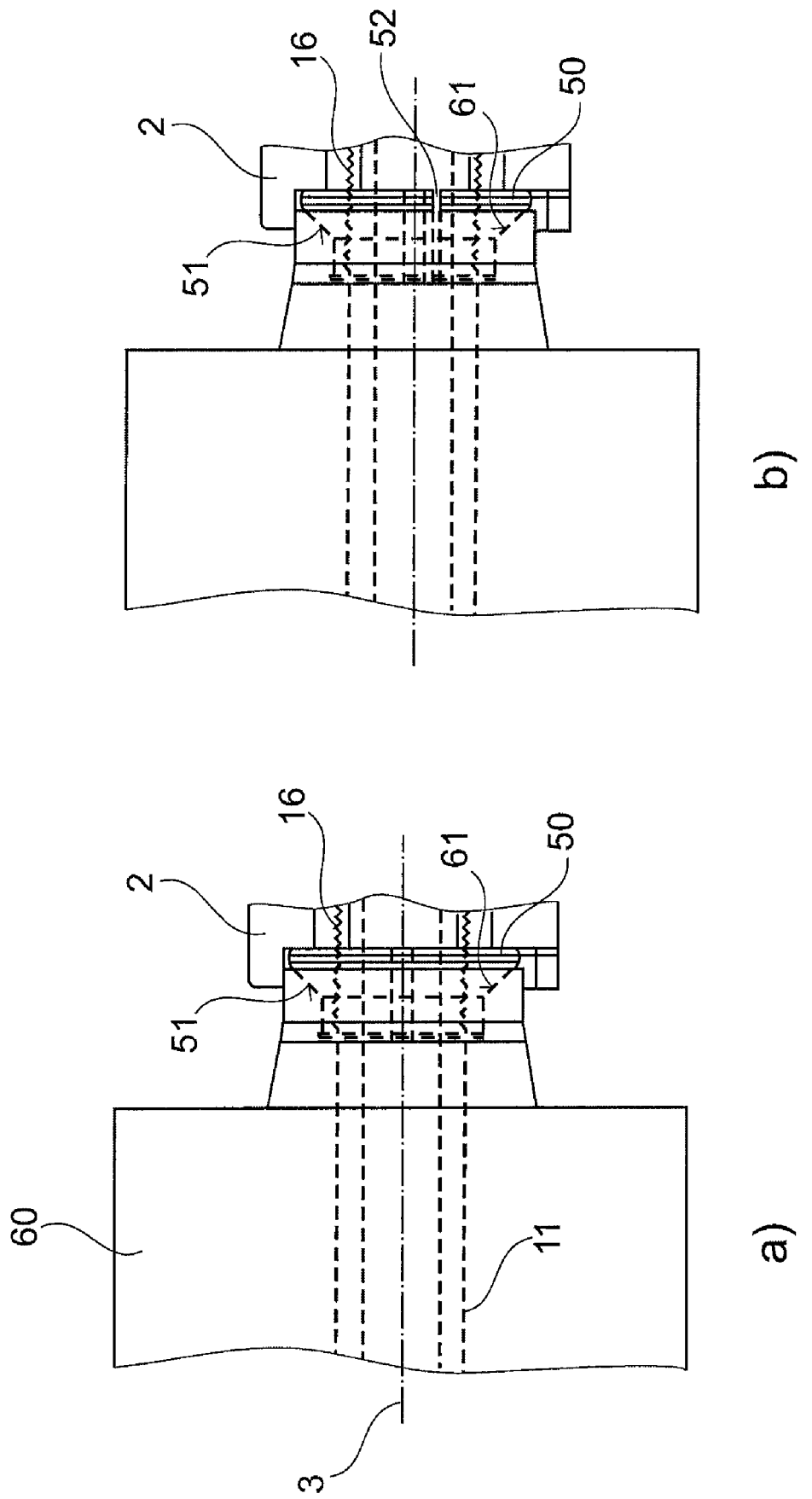
FIG. 7 illustrates an embodiment of a further annular bushing member for securing a wheel hub to the axle of a thru-axle system in accordance with the invention.

Referring now to FIG. 7 there is illustrated a further annular bushing member 50 disposed between the first and second dropouts in the axle portion 11. The bushing 50 comprises a load surface 51 that is conically tapered relative to the longitudinal centerline 3. Upon installation the load surface 51 contacts the contact surface 61 at the hub side. By screwing in and tightening the axle 10, a force acting along the longitudinal centerline 3 in the diretion of the center of the hub is transmitted to the annular bushing member 50 and produces a non-positive connection between the axle portion 11 and the annular bushing member 50. The longitudinal slot in the annular bushing member 50 is slightly pressed together, thereby securely locating the hub 60 snug and tight on the axle portion 11 to ensure an improved wheel installation relative to the fork and frame respectively.

The present invention has been described in details and with particular reference to the preferred embodiments. However, it will be understood by one having ordinary skill in the art that changes can be made to the embodiments without departing from the teaching or the scope of the present invention.

The invention claimed is:

1. A thru-axle system for installing a wheel on a hub disposed between a pair of dropouts of a frame or fork, comprising:
    an axle (10) having an axle portion (11) for extending between dropouts and for supporting a wheel on a hub (60), said axle portion (11) comprising first and second opposite ends;
    the first end of the axle portion (11) having a longitudinal centerline (3) and at least one radially protruding shoulder (12) for transmitting a force acting parallel to the direction of the longitudinal centerline (3);
    the second end of the axle portion (11) having a thread (16) for engaging a threaded sleeve (5) to secure the second end to one of the dropouts;
    at least one bushing (20) disposed between the radially protruding shoulder of the first end of the axle portion and the other dropout,
    the bushing having a central bore with first and second inner diameters, the first inner diameter large enough to admit the radially protruding shoulder of the first end of the axle and the second diameter large enough to admit the axle portion of the axle, a junction of said first and second diameters providing an annular wall (23) for engaging the radial shoulder of the axle;
    the bushing (20) further comprising an external conically shaped tapered surface (22) facing the other dropout for transmitting an axial force acting on the radial shoulder of the axle to the bushing and from the bushing to the first dropout.

2. The thru-axle system for installing a wheel as set forth in claim 1, wherein
    the bushing (20) has a slot substantially parallel to the longitudinal centerline (3); or
    the bushing (20) has a slot transverse to the longitudinal centerline (3).

3. The thru-axle system for wheel securement as set forth in claim 1, in the region of the radially protruding shoulder (12) the outer diameter of the first end comprises at least one groove (14) in which an O-ring (15) is arrangeable such that a part of the O-ring material protrudes beyond the outer diameter of the first end.

4. The thru-axle system for wheel securement as set forth in claim 3, the inner diameter of the bushing (20) comprises at least one groove (24) in which the O-ring (15) engages.

5. The thru-axle system for wheel securement as set forth in claim 1, the tapered pressing surface (22) comprises at least one groove (25) in which an O-ring (30) is arrangeable such that a part of the O-ring material protrudes beyond the pressing surface (22).

6. The thru-axle system for wheel securement as set forth in claim 1, the threaded sleeve (5) is rotatably inserted in the dropout (2) and the thread is eccentric relative to the longitudinal centerline (3).

7. The thru-axle system for wheel securement as set forth in claim 1, a sleeve disposed at the first dropout and having the contact surface (4) disposed on at an inner surface of a sleeve.

8. The thru-axle system for wheel securement as set forth in claim 1, the contact surface (4) for the first dropout (1) is a conically tapered inner surface of the axle mounting aperture in the first dropout.

9. The thru-axle system for wheel securement as set forth in claim 1, wherein the first end has a hex-headed socket or a six-pointed star head.

10. The thru-axle system for wheel securement as set forth in claim 1, the axle portion (11) at the outer part of the second end of the axle portion comprises a tapered outer diameter.

11. The thru-axle system for wheel securement as set forth in claim 1, the axle portion (11) is tubular.

12. The thru-axle system for wheel securement as set forth in claim 1, arranged at the second end is a conically tapered cap (17).

13. The thru-axle system for wheel securement as set forth in claim 1 disposed between the dropouts (1, 2) is at least one further bushing (50) including a conically tapered pressing surface (51) relative to the longitudinal centerline (3), the bushing (50) for contacting a corresponding contact surface (61) of the hub (60) to thereby positively locate the hub (60) on the axle portion (11).

14. The thru-axle system for wheel securement as set forth in claim 1, the conicity angles of the tapered surfaces (22, 51) and contact surfaces (4, 61) are substantially the same and range between 20° and 70°.

15. The thru-axle system for wheel securement as set forth in claim 1, the axle (10), bushing (20, 50), threaded sleeve (5) and/or other parts of the thru-axle system are made at least partly of a material selected from a group including metals, metal alloys, light metals, light metal alloys, aluminum, aluminum alloys, carbon fiber materials, plastics, and fiber-reinforced plastics.

* * * * *